US009010179B2

(12) United States Patent
Agneray et al.

(10) Patent No.: US 9,010,179 B2
(45) Date of Patent: Apr. 21, 2015

(54) DEVICE FOR MEASURING THE IONIZATION CURRENT IN A RADIOFREQUENCY IGNITION SYSTEM FOR AN INTERNAL COMBUSTION ENGINE

(75) Inventors: Andre Agneray, Boulogne Billancourt (FR); Franck Deloraine, Fontenay aux Roses (FR)

(73) Assignee: RENAULT s.a.s, Boulogne Billancourt (FR)

( * ) Notice: Subject to any disclaimer, the term of this patent is extended or adjusted under 35 U.S.C. 154(b) by 1078 days.

(21) Appl. No.: 13/063,112

(22) PCT Filed: Jul. 30, 2009

(86) PCT No.: PCT/FR2009/051529
§ 371 (c)(1),
(2), (4) Date: May 31, 2011

(87) PCT Pub. No.: WO2010/029238
PCT Pub. Date: Mar. 18, 2010

(65) Prior Publication Data

US 2011/0247599 A1 Oct. 13, 2011

(30) Foreign Application Priority Data

Sep. 9, 2008 (FR) ..................................... 08 56056

(51) Int. Cl.
*G01M 15/04* (2006.01)
*F02P 9/00* (2006.01)
(Continued)

(52) U.S. Cl.
CPC ................. *F02P 9/007* (2013.01); *F02P 17/12* (2013.01); *F02P 23/04* (2013.01); *F02P 2017/006* (2013.01); *F02P 2017/125* (2013.01)

(58) Field of Classification Search
CPC ........... F02P 17/00; F02P 17/02; F02P 17/12; F02P 2017/121; F02P 2017/125
USPC ................. 73/35.08, 114.58, 114.62, 114.67; 324/378, 380, 402
See application file for complete search history.

(56) References Cited

U.S. PATENT DOCUMENTS 7,710,104 B2 5/2010 Agneray et al.
8,006,546 B2 * 8/2011 Agneray et al. ........... 73/114.62

(Continued)

FOREIGN PATENT DOCUMENTS

FR 2 752 598 2/1998
FR 2 895 169 6/2007

(Continued)

OTHER PUBLICATIONS

International Search Report issued Dec. 21, 2009 in PCT/FR09/051529 filed Jul. 30, 2009.

*Primary Examiner* — Eric S McCall
(74) *Attorney, Agent, or Firm* — Oblon, McClelland, Maier & Neustadt, L.L.P.

(57) ABSTRACT

A device for radiofrequency ignition of an internal combustion engine, including a power supply circuit including a transformer with a secondary winding connected to at least one resonator that has a resonant frequency in excess of 1 MHz and including two electrodes configured to generate a spark to initiate combustion of a combustible mixture in a cylinder of the engine in response to an ignition command. A measuring capacitor is connected in series between the secondary winding and the resonator, a measurement circuit measures a current at terminals of the measuring capacitor, the current providing an electrical image of how combustion is progressing, and a protection circuit is connected between the capacitor and the measurement circuit and is configured to spare the current measurement acquisition time from electrical effects caused by the ignition command.

8 Claims, 3 Drawing Sheets

(51) Int. Cl.

| | |
|---|---|
| ***F02P 17/12*** | (2006.01) |
| ***F02P 23/04*** | (2006.01) |
| *F02P 17/00* | (2006.01) |

(56) References Cited

U.S. PATENT DOCUMENTS

| | | | | |
|---|---|---|---|---|
| 2002/0144544 | A1* | 10/2002 | Kesler | 73/118.1 |
| 2009/0153142 | A1 | 6/2009 | Agneray et al. | |
| 2009/0165764 | A1* | 7/2009 | Agneray et al. | 123/606 |
| 2009/0309499 | A1* | 12/2009 | Agneray et al. | 315/111.21 |
| 2010/0206276 | A1* | 8/2010 | Deloraine et al. | 123/608 |
| 2010/0229639 | A1 | 9/2010 | Agneray et al. | |
| 2010/0263643 | A1 | 10/2010 | Agneray et al. | |
| 2011/0203543 | A1* | 8/2011 | Agneray et al. | 123/143 B |

FOREIGN PATENT DOCUMENTS

| | | |
|---|---|---|
| FR | 2 899 394 | 10/2007 |
| FR | 2 913 297 | 9/2008 |

* cited by examiner

DEVICE FOR MEASURING THE IONIZATION CURRENT IN A RADIOFREQUENCY IGNITION SYSTEM FOR AN INTERNAL COMBUSTION ENGINE

BACKGROUND

The present invention relates to the field of the resonant radiofrequency ignition of an internal combustion engine. It relates more particularly to a device designed to measure the ionization current of the gases in the cylinders of the engine.

The ionization current of the gases in the cylinders of the engine is typically measured after the end of ignition and is then used to perform diagnostics on the progress of the combustion, for example in order to detect the angle corresponding to the maximum pressure of the combustion chamber, to detect pinking or even to identify combustion misfires.

Circuits for measuring the ionization current for a conventional ignition system are known, the operation of which consists in polarizing the air/fuel mixture present in the combustion chamber after the generation of the spark between the electrodes of the spark plug, in order to measure the current resulting from the propagation of the flame.

These circuits however have to be dedicated to the characteristics of conventional ignition and are not adaptable as such to the plasma generation ignition systems that use spark plugs of radiofrequency plug coil (BME) type, as described in detail in the following patent applications filed in the name of the applicant: FR 03-10766, FR 03-10767 and FR 03-10768.

As it happens, the specifics of radiofrequency ignition cause a number of constraints for measuring the current deriving from the combustion.

First of all, the ignition command signal induces significant currents which have an amplitude difference of more than 120 dB with the ionization current due to the combustion of the combustible mixture. Since this current is measured after the end of ignition, there is therefore a glare time, during which the measurement circuit cannot acquire a weak current.

Furthermore, since the measurement circuit is inserted into the ignition system, it is important not to significantly reduce the efficiency of the ignition system.

Finally, this type of radiofrequency ignition makes it possible to develop two types of discharges, a multi-filament spark and a mono-filament arc, which influence the ignition system differently. There is therefore a difficulty in guaranteeing independence of the measurement of the ionization current with respect to the type of discharge generated.

BRIEF SUMMARY

The present invention therefore aims to propose a device for measuring the ionization current in a radiofrequency ignition system, designed to address the abovementioned constraints, notably by making it possible to minimize the measurement masking period and by guaranteeing independence of the measurement with respect to the type of discharge generated.

With this objective in mind, the invention therefore relates to a device for the radiofrequency ignition of an internal combustion engine consisting of a power supply circuit comprising a transformer, a secondary winding of which is connected to at least one resonator that has a resonant frequency in excess of 1 MHz and comprising two electrodes that are able to generate a spark to initiate the combustion of a combustible mixture in a cylinder of the engine in response to an ignition command, characterized in that it comprises:

- a measuring capacitor connected in series between the secondary winding of the transformer and the resonator,

- a circuit for measuring a current at the terminals of said measuring capacitor, said current providing an electrical image of the trend of the combustion,
- a protection circuit, connected between the measuring capacitor and the measurement circuit, designed to free the acquisition time for the measurement of said current from the electrical effects induced by the ignition command.

According to one embodiment, the measuring capacitor is connected in series between the secondary winding of the transformer and the resonator, at the level of a ground return wire of the transformer and of the resonator.

The device according to the invention advantageously comprises means of polarizing the combustible mixture, designed to apply a polarization voltage between an electrode of the resonator and an engine ground.

According to one embodiment, the protection circuit comprises a diode bridge polarized by resistances at a power supply voltage that is proportional to the polarization voltage.

Preferably, the measurement circuit comprises a current-voltage converter produced using an operational amplifier.

According to one embodiment, the operational amplifier has a non-inverting input linked to the polarization voltage and an inverting input linked to a terminal of the measuring capacitor via the protection circuit.

Advantageously, the current-voltage converter comprises a feedback resistor and a feedback capacitor connected in parallel to the feedback resistor.

Preferably, the input impedance of the current-voltage converter is at least a hundred times lower than the impedance of the measuring capacitor.

According to one embodiment, a primary winding of the transformer is connected on one side to an intermediate power supply voltage and on the other side to the drain of at least one switch transistor controlled by a control signal, the switch transistor applying the power supply voltage to the terminals of the primary winding at a frequency defined by the control signal.

Preferably, the transformer has a variable turns ratio.

BRIEF DESCRIPTION OF THE DRAWINGS

Other features and advantages of the present invention will become more clearly apparent from reading the following description, given as an illustrative and nonlimiting example and made with reference to the appended figures, in which.

DETAILED DESCRIPTION

Figure 1:
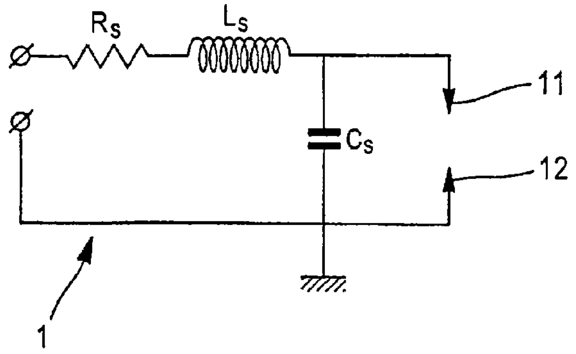
FIG. 1 is a diagram of a resonator modeling a plasma generation radiofrequency plug coil.

The plug coil used in the context of controlled radiofrequency ignition is electrically equivalent to a resonator 1 (see FIG. 1), the resonant frequency $F_C$ of which is in excess of 1 MHz, and typically close to 5 MHz. The resonator comprises, in series, a resistor Rs, an inductance coil Ls and a capacitor denoted Cs. Ignition electrodes 11 and 12 of the plug coil are connected to the terminals of the capacitor Cs of the resonator, making it possible to generate multi-filament discharges to initiate the combustion of the mixture in the combustion chambers of the engine, when the resonator is powered.

In practice, when the resonator is powered by a high voltage at its resonant frequency $F_C$ ($\frac{1}{2}\pi\sqrt{(Ls*Cs)}$) the amplitude at the terminals of the capacitor Cs is amplified so that multi-filament discharges develop between the electrodes, over distances of the order of a centimeter, at high pressure and for peak voltages less than 20 kV.

The term “branched sparks” then applies, in as much as the sparks involve the simultaneous generation of at least several lines or paths of ionization in a given volume, their branches also being omnidirectional.

This application to radiofrequency ignition then requires the use of a power supply circuit, capable of generating voltage pulses, typically of the order of 100 ns, able to reach amplitudes of the order of 1 kV, at a frequency very close to the resonant frequency of the plasma generation resonator of the radiofrequency plug coil.

Figure 2:
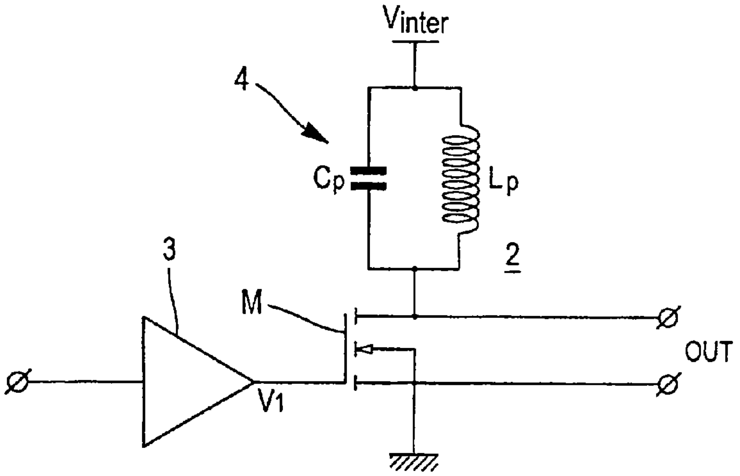
FIG. 2 is a diagram illustrating a power supply circuit according to the state of the art, that makes it possible to apply an alternating voltage within the radiofrequency range to the terminals of the plug coil modeled in FIG. 1.

FIG. 2 diagrammatically illustrates such a power supply circuit 2. The power supply circuit of the radiofrequency plug coil conventionally uses a so-called “pseudo class E power amplifier” arrangement.

This arrangement makes it possible to create the voltage pulses with the abovementioned characteristics. This arrangement consists of an intermediate DC power supply Vinter that can vary from 0 to 250V, a power MOSFET transistor M and a parallel resonance circuit 4 comprising a coil Lp in parallel with a capacitor Cp. The transistor M is used as a switch to control the switchings at the terminals of the parallel resonance circuit and of the plasma generation resonator 1 intended to be connected to an output interface OUT of the power supply circuit.

The transistor M is driven on its gate by a command logic signal V1, supplied by a command stage 3, at a frequency that should be substantially aligned with the resonant frequency of the resonator 1.

The intermediate DC power supply voltage $V_{inter}$ can advantageously be supplied by a high-voltage power supply, typically a DC/DC converter.

Thus, close to its resonant frequency, the parallel resonator 4 transforms the intermediate DC power supply voltage $V_{inter}$ into an amplified periodic voltage, corresponding to the power supply voltage multiplied by the Q-factor of the parallel resonator and applied to an output interface of the power supply circuit at the level of the drain of the switch transistor M.

The switch transistor M then applies the amplified power supply voltage to the output of the power supply, at the frequency defined by the command signal V1, that should be made as close as possible to the resonant frequency of the plug coil, so as to generate the high voltage at the terminals of the electrodes of the plug coil that is necessary to the development and sustaining of the multi-filament discharge.

The transistor thus switches high currents at a frequency of approximately 5 MHz and with a drain-source voltage that can reach 1 kV.

Figure 3:
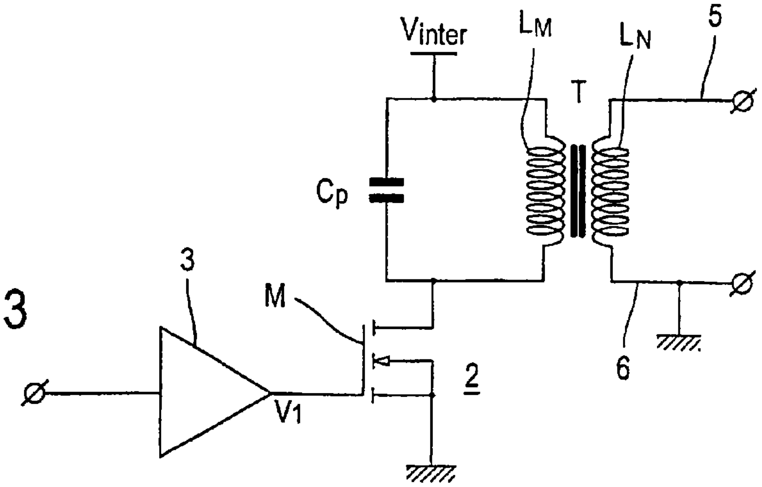
FIG. 3 is a diagram illustrating a variant of the circuit of FIG. 2.

According to a variant illustrated in FIG. 3, the parallel coil Lp is then replaced by a transformer T that has a turns ratio of between 1 and 5. The primary winding $L_M$ of the transformer is linked, on one side, to the intermediate power supply voltage $V_{inter}$ and, on the other side, to the drain of the switch transistor M, controlling the application of the intermediate power supply voltage $V_{inter}$ to the terminals of the primary winding at the frequency defined by the command signal V1.

The secondary winding $L_N$ of the transformer, one side of which is linked to ground by a ground return wire 6, is, for its part, designed to be connected to the plug coil. In this way, the resonator 1 of the plug coil, connected to the terminals of the secondary winding by link wires 5 and 6, including the ground return wire 6, is therefore powered by the secondary of the transformer.

Adaptation of the turns ratio then makes it possible to reduce the drain-source voltage of the transistor. Reducing the voltage on the primary however induces an increase in the current passing through the transistor. It is then possible to offset this constraint by placing, for example, two transistors in parallel controlled by the same control stage 3.

During ignition, it is essential for the branched spark to develop in volume in order to guarantee combustion and optimal engine operation. For the present application, the presence of combustion is symbolized by a variable resistance $R_{ION}$ between the terminals of the capacitor CS.

The ionization signal, representative of the trend of the combustion, has an amplitude of between 0.1 μA and 1 mA depending on the conditions of the combustion chamber (temperature, pressure, composition of the mixture, etc.). Efforts are therefore made to measure a signal that has an amplitude ratio of as much as 120 dB with respect to the ignition signal.

The ionization signal is a low frequency signal and a sampling at 100 kHz can be used to extract all of the useful information. In the case of radiofrequency ignition, the plasma generation resonator $R_S L_S C_S$ is driven at a frequency in excess of 1 MHz and typically between 4 MHz and 6 MHz. There is therefore the benefit of a frequency difference of close to two decades, which can then be used to offset the amplitude level differences.

Producing the measurement of the ionization current entails using a component that does not degrade the energy efficiency of the ignition.

Figure 4:
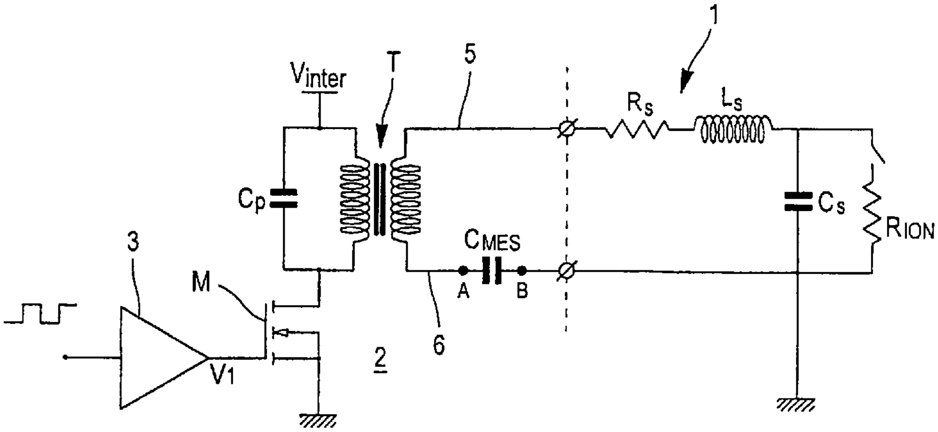
FIG. 4 is a diagram illustrating a power supply circuit designed according to the invention to measure the ionization current and the voltage at the terminals of the electrodes of the plug during an ignition command.

The solution adopted to this end consists, with reference to FIG. 4, in connecting a measuring capacitor $C_{MES}$ in series between the secondary winding of the transformer T and the resonator 1, on the ground return wire 6. The measuring capacitor is thus advantageously placed in the circuit at a position where the potential differences relative to ground are as low as possible.

A capacitor with a capacitance of around ten nanofarads makes it possible not to disturb the ignition system while retaining the possibility of performing low-frequency measurements of the ionization current.

Thus, the main benefit in the choice of this measuring component over other passive components lies in its radiofrequency behavior. In practice, at high frequencies, those skilled in the art know that the high-frequency equivalent circuit of a capacitor consists of a series resonator. As it happens, a resonator has an impedance, which changes depending on the frequency of the signal applied to its input, and is minimal at the resonant frequency of the resonator. This characteristic of the trend of the impedance of a resonator according to the frequency then enables the capacitor to present a very low impedance in the vicinity of the resonant frequency of the ignition and a high impedance in the frequency band used for the ionization signal ($F_{ION}$<15 kHz). The measuring capacitor is therefore judiciously chosen so as to present its lowest impedance in the frequency range used for the ignition command signal. This makes it possible to minimize the voltage at the terminals of the measuring capacitor to protect the measurement circuit, which will now be described with reference to FIG. 5.

A DC power supply, not represented, supplying a voltage $V_{polar}$, is provided to polarize the high-voltage electrode of the plug coil connected to the output of the power supply circuit with respect to the cylinder head of the engine, so as to make it possible to polarize the combustible mixture after the end of ignition.

The ionization current $I_{ION}$, representative of the combustion, is in fact a signal measured after the end of ignition, that is to say after the formation of the spark. Its amplitude therefore depends, among other things, on the polarization voltage applied between the electrode of the plug coil and the engine ground.

The polarization voltage is unipolar and typically between 1 V and 100 V. The expression "positive polarization" will be applied when the high-voltage electrode of the plug is polarized at a potential greater than that of the engine ground.

However, it is possible to polarize the combustible mixture negatively. The potential of the central electrode of the plug is then less than that of the engine ground. The polarization voltage is in this case typically between −100 V and −1 V.

Figure 5:
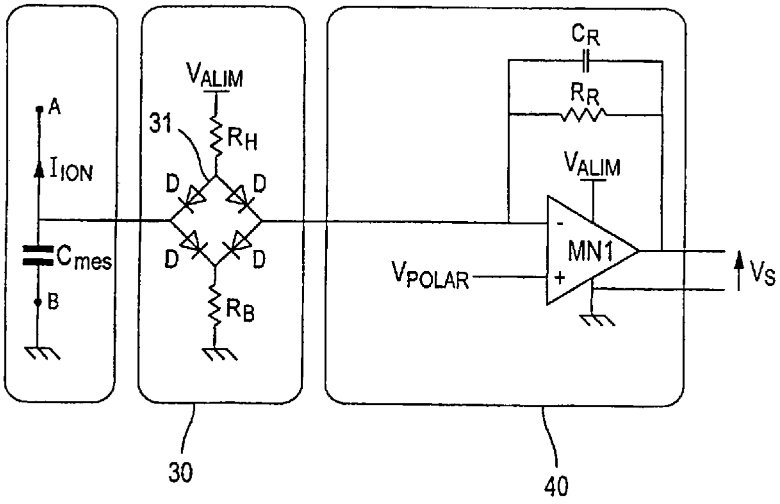
FIG. 5 illustrates one embodiment of the ionization current measurement circuit.

A circuit 40 for measuring the ionization current $I_{ION}$ at the terminals of the capacitor $C_{MES}$, supplying an electrical image of the trend of the combustion, is described in FIG. 5. With reference to this figure, the measurement circuit 40 is produced in the form of a current-voltage converter, designed to supply an output voltage $V_s$ that is proportional to the input current.

The converter comprises an operational amplifier MN1 and a feedback resistor $R_R$.

The operational amplifier MN1 has a non-inverting input (+) linked to the polarization voltage $V_{polar}$ and an inverting input (−) linked to a terminal of the capacitor $C_{MES}$ via a protection circuit 30, designed to free the measurement acquisition time of the effects of the formation of the spark and to which we will return in more detail hereinbelow.

The resistor $R_R$ is mounted between the inverting input (−) and the output of the operational amplifier MN1.

Figure 5A:
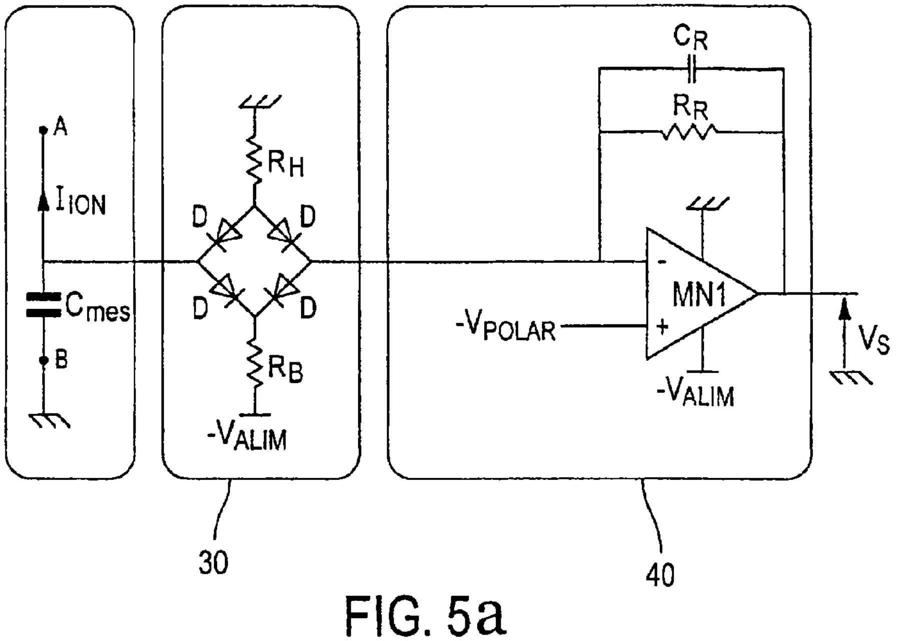
FIG. 5*a* illustrates a first variant of the embodiment of FIG. 5.

As a variant, as illustrated in FIG. 5*a*, in the case where the combustible mixture is polarized negatively, the non-inverting input (+) is linked to the negative polarization voltage $V_{polar}$ and the inverting input (−) linked to the terminal of the measuring capacitor via the protection circuit 30, while the resistor $R_R$ is connected between the inverting input (−) and the output of the operational amplifier MN1.

Figure 5B:
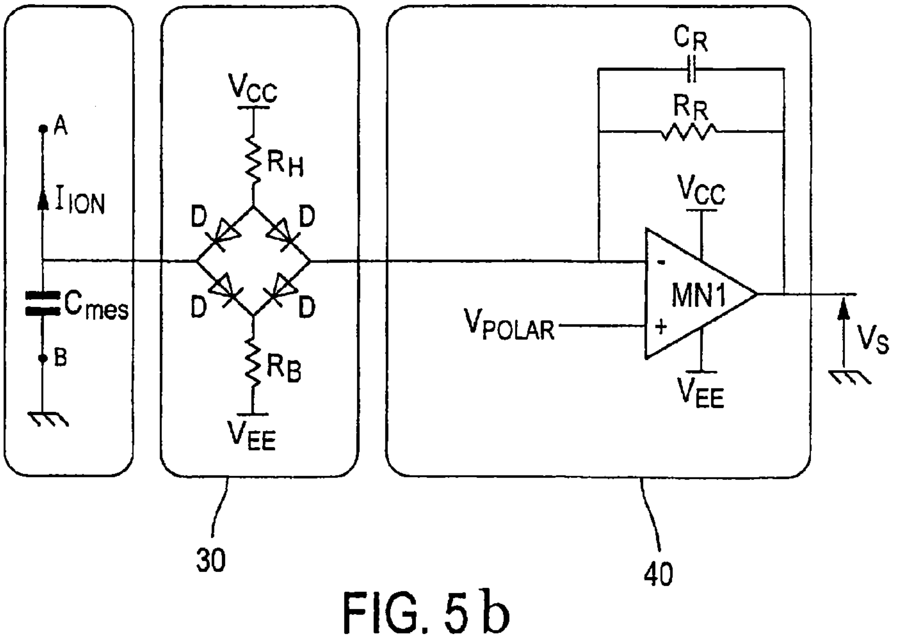
FIG. 5*b* illustrates a second variant of the embodiment of FIG. 5.

According to another variant illustrated in FIG. 5*b*, it is also possible to choose any polarization of the combustible mixture with a polarization voltage $V_{polar}$ that observes the following conditions:

$$V_{EE} < V_{polar} < V_{CC} \text{ where } V_{EE} < 0 \text{ and } V_{CC} > 0$$

Such a current/voltage arrangement is able to accurately measure very weak currents.

The input of the operational amplifier is equivalent to an inductance of value $L_e$. This leads to the appearance of pseudoperiodic oscillations of frequency $F_{OSC}$ greater than 100 kHz after the end of ignition, due to the circuit formed by the input impedance $|Z_E|$ of the current-voltage converter and the measuring capacitor $C_{MES}$, which reduce the desaturation time of the measurement circuit. It is therefore necessary to add a feedback capacitance $C_R$ in parallel with the feedback resistor $R_R$ in order to damp these oscillations. A capacitance is therefore chosen that satisfies:

$$Fosc > f = \frac{2\pi}{R_R C_R} > 100 \text{ kHz}$$

The feedback capacitance is therefore negligible for the useful frequency band of the measured signal representative of the trend of the combustion (typically less than 100 kHz), while optimizing the desaturation time of the measurement circuit.

Furthermore it is important for the feedback impedance to be judiciously chosen to ensure that the output voltage $V_S$ of the measurement circuit is correctly proportional to the current $I_{ION}$ deriving from the combustion.

Typically, the measurement capacitor $C_{MES}$ charges during the spark generation phase. It is important for the input impedance $Z_E$ of the current-voltage converter to be low (at least 100 times lower) compared to the impedance of the measuring capacitor $Z_{MES}$. This condition guarantees that the current-voltage converter, and not the measuring capacitor, supplies the current that is the image of the development of the combustion. In other words, it is essential for the impedance of the capacitor $C_{MES}$ to be high compared to the input impedance of the amplifier in order for all of the ionization current $I_{ION}$ to be retrieved in the amplifier MN1.

It is known that this converter has an input impedance which follows the following relationship:

$$|Z_E| = \frac{|Z_R|}{G}$$

G being the natural gain of the operational amplifier.

With:

$$|Z_R| = \frac{R_R}{1 + j\omega R_R C_R} \approx R_R$$

The following relationship should therefore be satisfied for all the frequencies below 100 kHz:

$$\frac{|Z_{MES}|}{|Z_R|} \cdot G > \alpha,$$

in which a $\alpha \geq 100$

Thus, if the above conditions are satisfied, the following applies:

$$V_S = R_R \cdot I_{ION} + V_{POLAR}$$

We will now return in more detail to the protection circuit 30, which makes it possible to be free of the effects of the ignition by fulfilling an anti-glare function for the measurement circuit 40 described previously. In this way, the acquisition of the measurement of the current $I_{ION}$ representative of the trend of the combustion can advantageously be done independently of the effects of the formation of the spark.

In practice, useful information concerning the combustion can be extracted from the ion signal soon after the end of ignition.

As it happens, it has been seen that the strong currents induced by the ignition command signal, which have an amplitude difference of close to 120 dB with the current representative of the combustion, cause a glare time, or masking period, during which the acquisition of a weak current cannot be done.

Also, in order to minimize the effects associated with the ignition command, provision is made to connect the protection circuit 30 between the measuring capacitor and the current-voltage converter forming the measurement circuit 40. In practice, the current-voltage converter must retain the best possible dynamic range and exhibit a desaturation time preferably less than 300 μs to allow for a reliable measurement of the combustion at maximum speed.

The protection circuit 30 comprises a diode bridge 31, polarized by resistors $R_H$ and $R_E$, at a power supply voltage $V_{ALIM}$, preferably close to the polarization voltage $V_{POLAR}$.

This architecture is stable and does not disturb the measurement if the polarization current $I_D$ flowing in the diodes of the protection circuit is high compared to the current supplied by the converter.

It is possible to check that:

$$I_D = \frac{V_{ALIM}}{2(r_{dyn} + R_B + R_H)} \text{ and } r_{dyn} \approx \frac{1}{40 \times I_D}$$

$R_{dyn}$, being the dynamic resistance of a diode.

Therefore:

$$I_D \approx \frac{V_{ALIM} - 1/20}{R_B + R_H}$$

Or, for $V_{ALIM}$=12V and $R_E$=$R_H$=1 kit, the following is obtained:

$$ID = 3 \text{ mA} > I_{IONmax} = 500 \ \mu\text{A}.$$

This equation makes it possible to find the good trade-off between the stability of the arrangement and the average consumption of the protection circuit. The resistors $R_B$ and $R_H$ can typically have a value of between 100Ω and 50 kΩ and may be of different values.

The optimum polarization voltage $V_{POLAR}$ is thus defined by:

$$V_{POLAR} = \frac{R_H}{R_H + R_B} \cdot V_{ALIM}$$

The voltage $V_{POLAR}$ may, for example, be obtained from the voltage $V_{ALIM}$ via a resistive divider circuit, well known per se.

The protection circuit 30 thus has a dual function. It makes it possible to maintain a low desaturation time for the measurement circuit regardless of the spark generation conditions. Also, it favors the robustness of the measurement circuit to each type of spark that a resonant ignition system can generate.

The invention claimed is:

1. A device for radiofrequency ignition of an internal combustion engine including a power supply circuit including a transformer, a secondary winding of which is connected to at least one resonator that has a resonant frequency in excess of 1 MHz, and two electrodes configured to generate a spark to initiate combustion of a combustible mixture in a cylinder of the engine in response to an ignition command, the device comprising:

a measuring capacitor connected in series between the secondary winding of the transformer and the resonator;

a circuit for measuring a current at terminals of the measuring capacitor, the current providing an electrical image of a trend of the combustion; and a protection circuit, connected between the measuring capacitor and the measurement circuit, the protection circuit comprising a diode bridge polarized by resistances at a power supply voltage that is proportional to a polarization voltage applied between an electrode of the resonator and an engine ground, and the protection circuit maintains a low desaturation time for measurement of the current.

2. The device as claimed in claim 1, wherein the measuring capacitor is connected in series between the secondary winding of the transformer and the resonator, at a level of a ground return wire of the transformer and of the resonator.

3. The device as claimed in claim 1, wherein a primary winding of the transformer is connected on a first side to an intermediate power supply voltage and on a second side to a drain of at least one switch transistor controlled by a control signal, the switch transistor applying the power supply voltage to the terminals of the primary winding at a frequency defined by the control signal.

4. The device as claimed in claim 1, wherein the transformer has a variable turns ratio.

5. The device as claimed claim 1, wherein the measurement circuit comprises a current-voltage converter produced using an operational amplifier.

6. The device as claimed in claim 5, wherein the operational amplifier includes a non-inverting input linked to the polarization voltage and an inverting input linked to a terminal of the measuring capacitor via the protection circuit.

7. The device as claimed in claim 5, wherein the current-voltage converter comprises a feedback resistor and a feedback capacitor connected in parallel to the feedback resistor.

8. The device as claimed in claim 5, wherein input impedance of the current-voltage converter is at least a hundred times lower than impedance of the measuring capacitor.

* * * * *